United States Patent
Cheng et al.

(10) Patent No.: US 11,095,865 B2
(45) Date of Patent: Aug. 17, 2021

(54) COLOR BALANCE IN ELECTRONIC DEVICES

(71) Applicant: Hewlett-Packard Development Company, L.P., Spring, TX (US)

(72) Inventors: Yow Wei Cheng, Taipei (TW); Emily Ann Miginnis, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 21 days.

(21) Appl. No.: 16/634,049

(22) PCT Filed: Jul. 24, 2017

(86) PCT No.: PCT/US2017/043450
§ 371 (c)(1),
(2) Date: Jan. 24, 2020

(87) PCT Pub. No.: WO2019/022697
PCT Pub. Date: Jan. 31, 2019

(65) Prior Publication Data
US 2021/0152800 A1   May 20, 2021

(51) Int. Cl.
*H04N 9/73* (2006.01)
*H04N 9/64* (2006.01)

(52) U.S. Cl.
CPC ............ *H04N 9/735* (2013.01); *H04N 9/646* (2013.01)

(58) Field of Classification Search
CPC .............................. H04N 9/735; H04N 9/646
USPC ..................................................... 348/223.1
See application file for complete search history.

(56) References Cited

U.S. PATENT DOCUMENTS

| | | | | |
|---|---|---|---|---|
| 5,327,226 A | * | 7/1994 | Tanabe | H04N 9/735 348/188 |
| 7,719,606 B2 | * | 5/2010 | Wallace | H04N 9/735 348/360 |
| 8,068,147 B2 | | 11/2011 | Tang | |
| 8,717,460 B2 | | 5/2014 | Zhang et al. | |
| 9,424,628 B2 | | 8/2016 | Yao | |
| 2002/0196335 A1 | * | 12/2002 | Ozawa | H04N 9/735 348/70 |

(Continued)

FOREIGN PATENT DOCUMENTS

WO    WO-2007126707 A1    11/2007
WO    WO-2011152848 A1    12/2011

OTHER PUBLICATIONS

Chiu, L-C et al. Calibration-based Auto White Balance Method for Digital Still Camera, 2010, <http://www.csie.ntu.edu.tw/~fuh/personal/Calibration-BasedAutoWhiteBalance.pdf>.

*Primary Examiner* — Michael Lee
(74) *Attorney, Agent, or Firm* — Rahman LLC (57) ABSTRACT

An example electronic device includes an image sensing tool to measure an average color balance value across a plurality of frames of a media stream. A processor verifies that the color balance value of the plurality of frames of the media stream is stable, and computes a selected color balance value of the media stream. An imaging device captures an image of a predetermined color calibration chart. The processor compares a color balance value of the image of the predetermined color calibration chart with a predefined color balance value, and validates the selected color balance value of the media stream to align with a selected region of the image.

15 Claims, 8 Drawing Sheets

(56) References Cited

U.S. PATENT DOCUMENTS

| | | | |
|---|---|---|---|
| 2005/0162542 A1* | 7/2005 | Nakayama | H04N 5/23245 |
| | | | 348/362 |
| 2005/0270383 A1 | 12/2005 | Hung | |
| 2006/0257022 A1* | 11/2006 | Hayaishi | H04N 1/628 |
| | | | 382/167 |
| 2007/0248330 A1 | 10/2007 | Pillman | |
| 2008/0211934 A1* | 9/2008 | Takeuchi | H04N 9/735 |
| | | | 348/231.99 |
| 2011/0298944 A1* | 12/2011 | Kuo | H04N 5/3572 |
| | | | 348/223.1 |
| 2014/0168677 A1 | 6/2014 | Mukaibara | |

* cited by examiner

COLOR BALANCE IN ELECTRONIC DEVICES

BACKGROUND

Cameras and other image capturing devices process the captured images of various objects. Lighting impacts the color temperature of objects. Digital image processing attempts to correct the captured images by removing undesired color casts.

DETAILED DESCRIPTION

Captured images and videos taken from cameras and other image and video capturing devices may contain color aberrations and other color artifacts due to the nonuniformity of the light source and its color temperature. The automatic color balance feature in digital cameras may not be able to quickly and accurately adjust the color balance in captured images and videos thereby resulting in images having reduced color quality. The examples described herein provide techniques to calibrate and validate the color being captured by an imaging device such as cameras, tablets, webcams, scanners, etc. The examples provide for the use of automatic color balance for imaging devices as used as a means for color point correction to a light source. The example techniques use a color balance algorithm to calibrate color profiles under known light source(s), even under non-uniform light. The color of each image frame is measured and once color balance has been achieved for several frames, the color balance computation is performed by averaging the color of each of the image frames. A validation mechanism is used to verify whether the calibration results meets a pre-defined criterion. The validation process includes detecting a color checker, extracting color tiles, performing orientation correction, and performing a pass/fail comparison.

Figure 1:
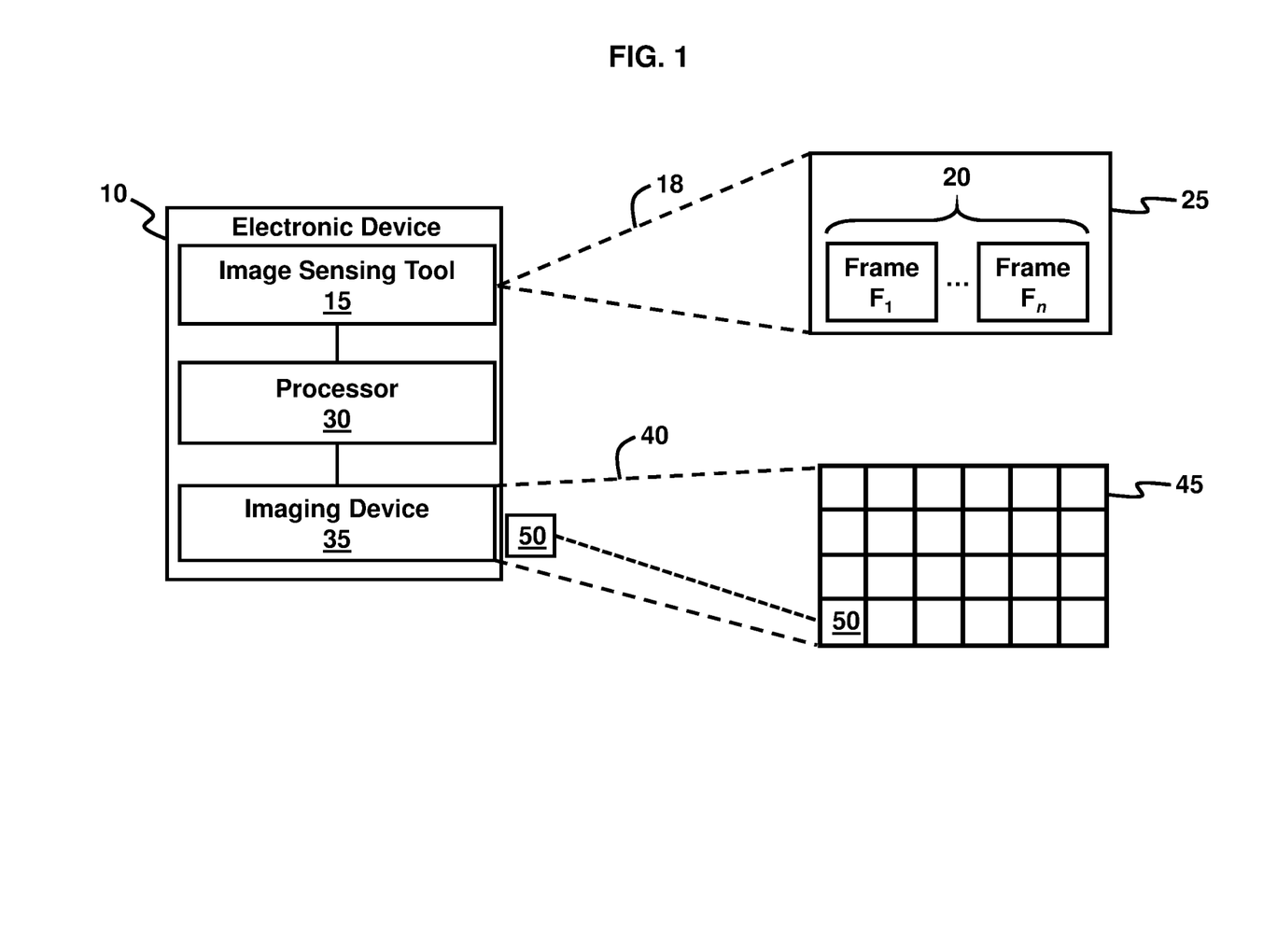
FIG. 1 is a system block diagram for performing color balance calibration and validation in an electronic device, according to an example.

FIG. 1 is a system block diagram for performing color balance calibration and validation in an electronic device 10, according to an example. As shown in FIG. 1, an electronic device 10 comprises an image sensing tool 15 to measure an average color balance value 18 across a plurality of frames 20 of a media stream 25. According to various examples, the electronic device 10 may comprise any electronic device having imaging capturing capabilities such as a digital camera, a computer including projector-based computer systems, and a mobile communication device, as well as non-computer devices. The image sensing tool 15 may comprise an image sensor, an image signal processor (ISP), or software module that is not a part of the hardware. The media stream 25 may comprise an image or video or a combination of both, including still frame capture, for example. A processor 30 verifies that the average color balance value 18 of the plurality of frames 20 of the media stream 25 is stable, and computes a selected color balance value of the media stream 25. An imaging device 35 captures an image 40 of a predetermined color calibration chart 45. For example, the color calibration chart 45 may comprise a ColorChecker® color rendition chart, available from Amazys Holding GmbH, Regensdorf, Switzerland. The processor 30 may be part of the imaging device 35 or be part of a separate computer or computing system, according to various examples. The processor 30 is to compare a color balance value of the image 40 of the predetermined color calibration chart 45 with a predefined color balance value, and validate the selected color balance value of the media stream 25 to align with a selected region 50 of the image 40. The selected region 50 of the image 40 of the color calibration chart 45 may be the white color block/tile of the chart 45, according to an example, or may be the tiles for any other color or colors, according to another example.

Figure 2:
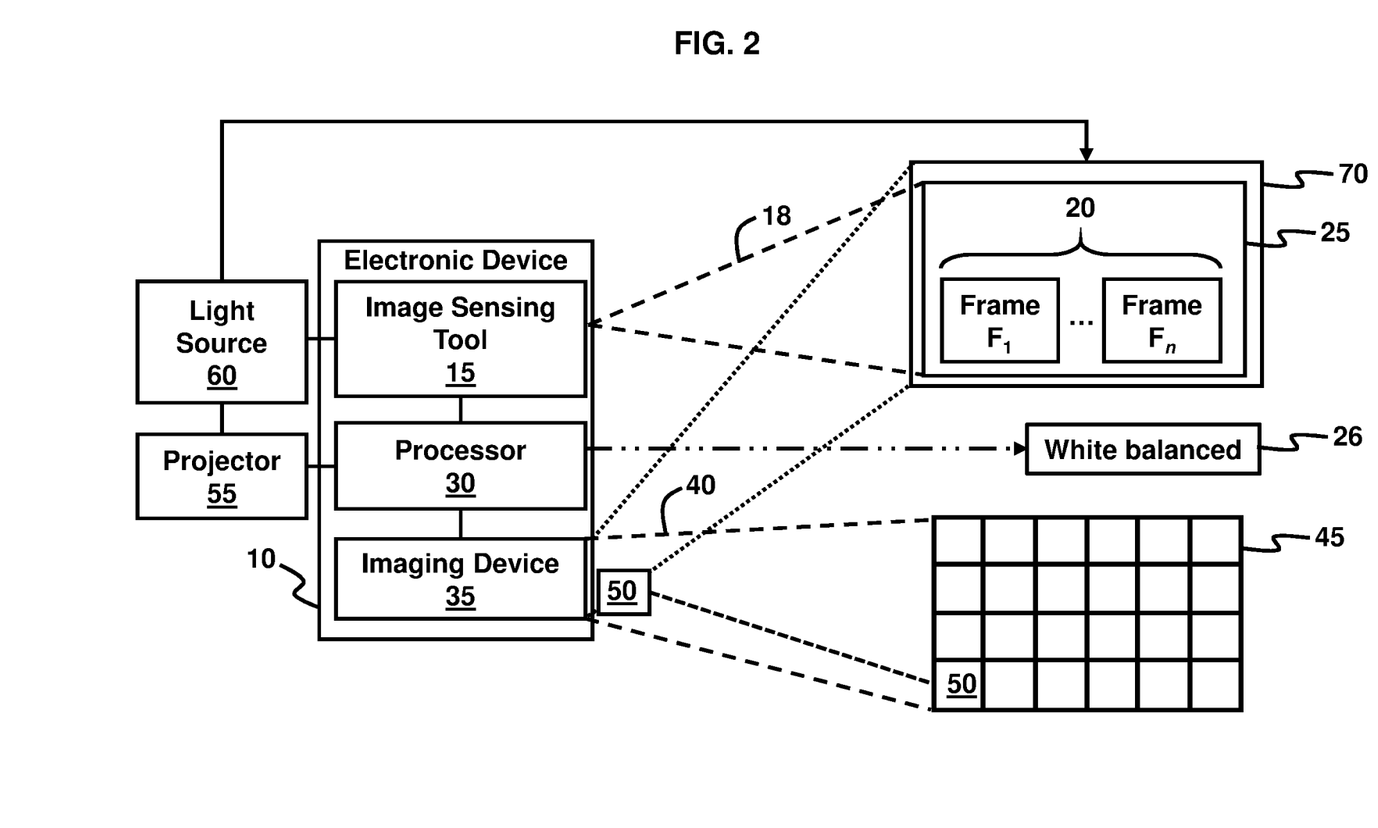
FIG. 2 is a system block diagram for performing color balance calibration and validation in an electronic device, according to another example.

FIG. 2, with reference to FIG. 1, is a system block diagram for performing color balance calibration and validation in an electronic device 10, according to another example. As shown in FIG. 2, the electronic device 10 comprises a projector 55 to provide a light source 60 for the image sensing tool 15 to detect. In one example, the projector 55 and light source 60 are embedded in the electronic device 10, and in another example, the projector 55 and light source 60 are external to the electronic device 10. When configured external to the electronic device 10, the projector 55 and light source 60 may or may not be connected to the electronic device 10. The light source 60 may be a known or unknown light source in that the color characteristics including light intensity of the light source 60 may be known or unknown, according to various examples. The imaging device 35 is to capture the media stream 25 under a selected light source setting. The processor 30 is to produce a uniform color balanced media stream 26 based on the corrected color balance value. The processor 30 is to remove color aberrations and color artifacts from the uniform color balanced media stream 25. The processor 30 is to produce user-defined chromatic images based on the corrected color balance value.

Figure 3:
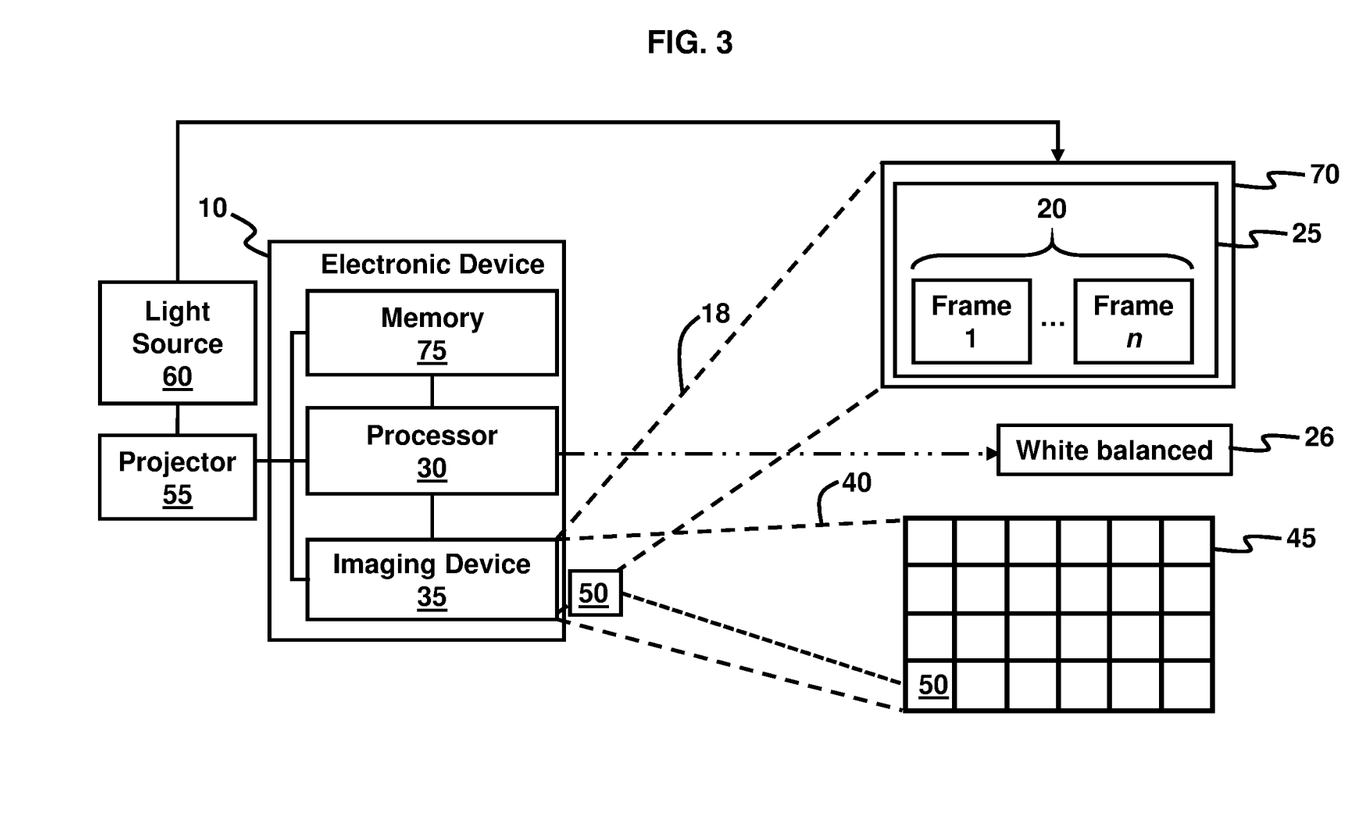
FIG. 3 is a system block diagram for performing color balance calibration and validation in an electronic device and generation of a color balanced image, according to an example.

As further shown in FIG. 2, an electronic device 10 may comprise a light source 60 to project light on an object 70 at a selected lighting level. An imaging device 35 captures a media stream 25 of the object 70 and a predetermined color calibration chart 45. An image sensing tool 15 measures a color balance value 18 of the media stream 25. A processor 30 computes a selected color balance value of the media stream 25, aligns the selected color balance value of the media stream 25 with a selected region 50 of the predetermined color calibration chart 45, and performs a color balance validation of the media stream 25 to the selected lighting level. While the figures illustrate the selected region 50 to comprise a single tile in the color calibration chart 45, the examples herein are not limited to only a single tile. In other examples, some or all of the color checker tiles may be used as the selected region 50. The selected lighting level comprises non-uniform light. The electronic device 10 comprises a projector 55 to output a color balanced media stream 26 based on a color balance calibration value. FIG. 3, with reference to FIGS. 1 and 2, is a system block diagram for performing color balance calibration and validation in an electronic device 10 and generation of a color balanced image 26, according to an example. As shown in FIG. 3, the electronic device 10 may comprise a memory 75 to store the color balance calibration value, wherein the processor 30 is to alter the color balanced media stream 26 output from the projector 55 to align with the color balance calibration value stored in the memory 75.

Figure 4A:
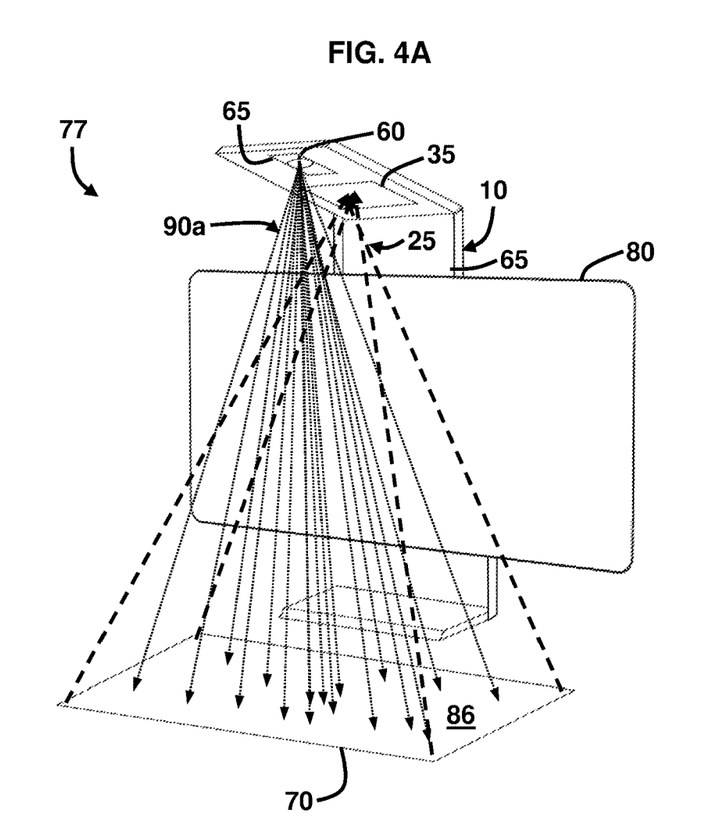
FIG. 4A is a schematic diagram illustrating a projector-based computer system performing an image capturing process, according to an example.
Figure 4B:
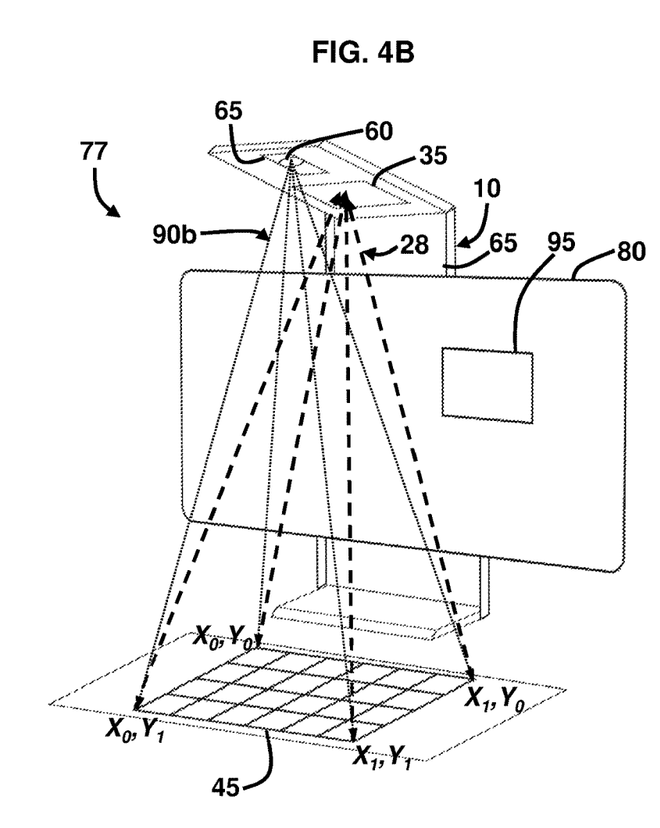
FIG. 4B is a schematic diagram illustrating a projector-based computer system performing a validation process, according to an example.

FIGS. 4A and 4B, with reference to FIGS. 1 through 3, are schematic diagrams illustrating an example projector-based computer system 77 that provides camera color calibration and validation after tuning to a light source 60 for removing color aberrations and color artifacts from a captured image 25 of an object 70. FIG. 4A illustrates the projector-based computer system 77 performing an image capturing process, and FIG. 4B illustrates the projector-based computer system 77 performing a validation process, according to an example. The calibration and validation process may be used to produce a uniform color/light image 95 configured to any light source 60. This prevents color aberrations and other color artifacts from appearing in the image 95 due to the nonuniformity of the light source 60 and its color temperature.

The projector-based computer system 77 may comprise an electronic device 10, which may comprise the processor 30 and memory 75, not shown in FIGS. 4A and 4B. A screen 80, such as a display monitor may be operatively connected to the electronic device 10. The electronic device 10 may comprise an imaging device 35 and projector 55. The projector 55 is not shown in FIGS. 4A and 4B. However, the projector 55 may be positioned in any location in the electronic device 10 including behind the screen 80 in column 65, in one example. Moreover, the imaging device 35 and projector 55 may be external to the electronic device 10 and as part of their own separately-configured devices, according to another example. Various configurations exist for the electronic device 10, and accordingly the examples provided in FIGS. 4A and 4B are merely one such example configuration of a projector-based computer system 77. As such the examples illustrated in the drawings and described herein do not limit the scope of the various other possible configurations of the electronic device 10.

As shown in FIG. 4A, a light source 60 projects light 90a onto an object 70. The light source 60 may comprise lighting elements, in one example. As a non-limiting example, these lighting elements may comprise light-emitting diodes (LEDs), in one example. The object 70 may be a mat comprising a neutral-colored surface 86. The object 70 may be provided adjacent to the electronic device 10 and substantially below the imaging device 35 and projector 55. The imaging device 35 captures a media stream 25 of the object 70. After the media stream 25 of the object 70 is captured by the imaging device 35, a color calibration chart 45 is placed on the object 70; e.g., the surface 86 of the mat, as indicated in FIG. 4B. The light source 60 projects light 90b onto the color calibration chart 45 including the four corners; e.g., $X_0$, $Y_0$; $X_1$, $Y_0$; $X_0$, $Y_1$; and $X_1$, $Y_1$, of the color calibration chart 45. Thereafter, the imaging device 35 captures an image 28 of the color calibration chart 45 and also detects the four corners; e.g., $X_0$, $Y_0$; $X_1$, $Y_0$; $X_0$, $Y_1$; and $X_1$, $Y_1$, of the color calibration chart 45. A uniform color-balanced image 95 of the object 70 may be displayed on the screen 80 or the object 70. The image 95 is displayed without color aberrations and color artifacts.

Figure 4C:
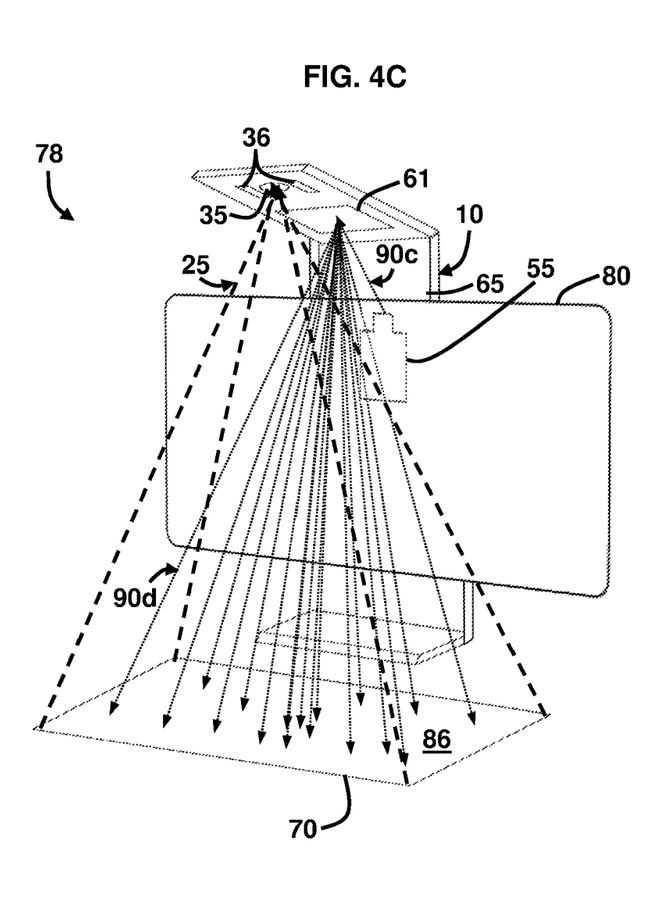
FIG. 4C is a schematic diagram illustrating a projector-based computer system performing an image capturing process, according to another example.
Figure 4D:
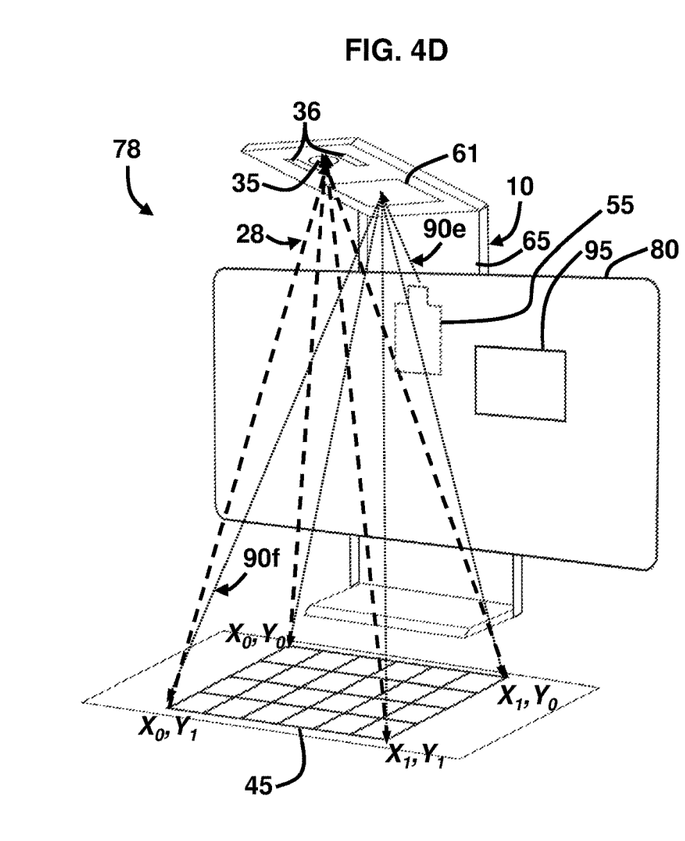
FIG. 4D is a schematic diagram illustrating a projector-based computer system performing a validation process, according to another example.

FIGS. 4C and 4D, with reference to FIGS. 1 through 4B, are schematic diagrams illustrating another example of a projector-based computer system 78 that provides camera color calibration and validation after tuning to a light source for removing color aberrations and color artifacts from a captured image 25 of an object 70. FIG. 4C illustrates the projector-based computer system 78 performing an image capturing process, and FIG. 4D illustrates the projector-based computer system 78 performing a validation process, according to an example. The projector 55 is shown in phantom lines to represent its positioning behind the screen 80 in this example; e.g., in column 65 of the electronic device 10. In other configurations, the projector 55 may be positioned in other locations in or on the electronic device 10 and may be configured in a separate device altogether apart from the electronic device 10.

In the example shown in FIG. 4C, a reflecting element 61 receives light 90c generated by the projector 55 and then reflects the light 90d, which is projected onto the object 70; e.g., the surface 86 of the mat. In one example, the reflecting element 61 comprises a mirror. Optional additional light sources 36 may be positioned adjacent to the imaging device 35 to provide an extra light source to the system 78 or to be turned on without the projector 55, serving as the only light source for system 78. While FIGS. 4C and 4D illustrate the additional light sources 36 positioned on either side of the imaging device 35, other configurations are possible. For example, the light sources 36 may be positioned in a halo-like configuration surrounding the lens of the imaging device 35. Further configurations are also possible. The imaging device 35 captures the image 25 of the object 70. After the color calibration chart 45 is positioned on the surface 86 of the mat, as shown in the example of FIG. 4D, the reflecting element 61 receives light 90e generated by the projector 55 and then reflects the light 90f, which is projected onto the color calibration chart 45 including the four corners; e.g., $X_0$, $Y_0$; $X_1$, $Y_0$; $X_0$, $Y_1$; and $X_1$, $Y_1$, of the color calibration chart 45. Again, the light sources 36 may be utilized as an extra light source or the only light source in the system 78. For example, the projector 55 may be turned on with the extra light sources 36 or without them or the extra light sources 36 may be turned on by themselves. Furthermore, ambient overhead lighting may also be on too, in accordance with another example. Thereafter, the imaging device 35 captures an image 28 of the color calibration chart 45. A uniform color-balanced image 95 of the object 70 may be displayed on the screen 80 or the object 70. The image 95 is displayed without color aberrations and color artifacts.

Figure 5:
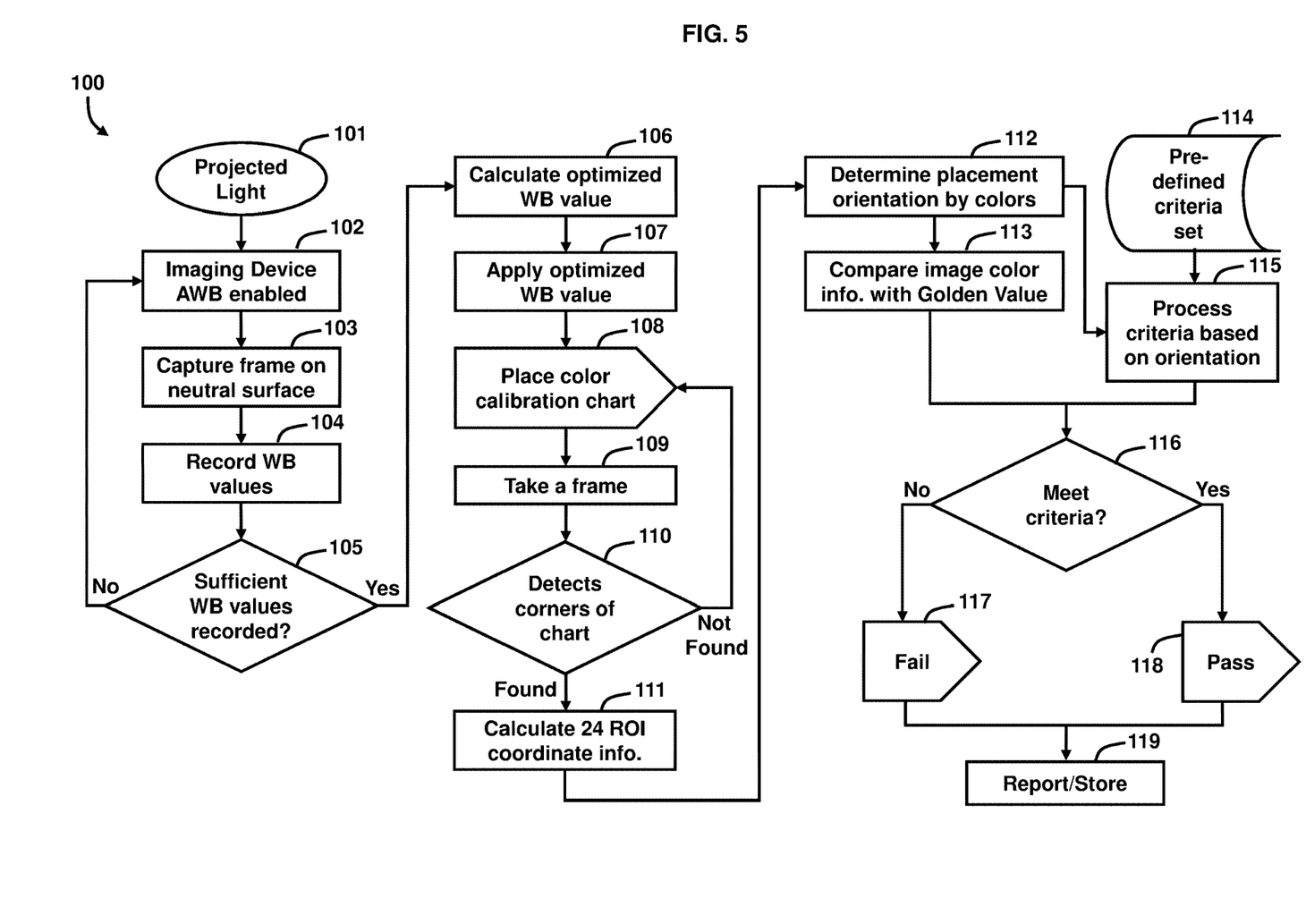
FIG. 5 is a flowchart illustrating a method of performing color balance calibration and validation in an electronic device, according to an example.

FIG. 5, with reference to FIGS. 1 through 4D, is a flowchart illustrating a method 100 of performing color balance calibration and validation in an electronic device 10, according to an example. Because image capture and video output quality may be subjective, a user may want to achieve a color balanced image 95 irrespective of the known ambient light conditions provided by the light source 60 or may want to achieve a particular xy color target in terms of the xyY color space. This may be achieved through the color calibration and validation process described in method 100.

In block 101, the light source 60 is applied over a neutral target; e.g., object 70, under a field of view of the imaging device 35. In block 102, the imaging device 35 with auto color balance capability is provided or a post-processing software module can be used to perform the same color balance operation. In block 103, the imaging device 35 captures a plurality of frames 20 of a media stream 25 associated with an object 70. Here, the imaging device 35 that is to be calibrated is enabled to capture the media stream 25; e.g., image or video stream or a combination of both. For example, the imaging device 35 may take the first fifteen frames 20; e.g., $F_1 \ldots F_{15}$, of the media stream 25. The imaging device 35 may capture the entire field of view, which may include a portion slightly over the edges of the object 70; e.g., the mat. In block 104, the captured image taken by the imaging device 35 is stored in memory 75. The color balance value of each of the plurality of frames 20; e.g., $F_1 \ldots F_n$, is measured. Next, in block 105, the imaging device 35 provides a selected color balance value, which may comprise red, green, blue color values; e.g., RGB values. The processor 30 or imaging device 35 may determine whether a sufficient number of color balance values are recorded. Again, the imaging device 35 may have taken the first fifteen frames 20; e.g., $F_1 \ldots F_{15}$, of the media stream 25 in order to get fifteen color balance values, in an example. If the processor 30 or imaging device 35 determines that an insufficient number of color balance values have been recorded to provide a statistically meaningful data set, then the method 100 reverts back to block 102. In an example, the processor 30 may calculate the standard deviation of the fifteen color balance values and compare this to a predetermined color balance value to determine if the data stet is statistically meaningful. In another example, once a stable color balance value has been achieved for several frames, then the processor 30 may determine that a sufficient number of color balance values have been achieved.

If the processor 30 or imaging device 35 determines that a sufficient number of color balance values have been recorded to provide a statistically meaningful data set, then the method 100 continues to block 106, where the processor 30 calculates an optimized color balance value, which may include taking the standard deviation of the fifteen color balance values. As an example, in block 106, the processor 30 may utilize an averaging process by taking fifteen sets of color balance values, sorting the sets by increasing or decreasing values, removing the top three values and the bottom three values, and calculating an average; e.g., mean, color balance value 18 of the remaining values, which becomes the optimized color balance value. Next, in block 107, the processor 30 applies the optimized color balance value to the imaging device 35. The optimized color balance value may be stored in memory 75, which may be part of the imaging device 35 in one example, or may be part of a separate device or system. In another example, the optimized color balance value may be tuned to another color; e.g., red, etc. thereby providing a red balanced value that is enabled and then optimized.

Thereafter, method 100 moves to a validation process, wherein block 108 provides for placing a color calibration chart 45 in the field of view of the imaging device 35. In block 109, the imaging device 35 takes an image; e.g., captures a frame, of the color calibration chart 45. In block 110, the imaging device 35 detects the four corners; e.g., $X_0$, $Y_0$; $X_1$, $Y_0$; $X_0$, $Y_1$; and $X_1$, $Y_1$, of the color calibration chart 45. If the four corners of the color calibration chart 45 are not found, then an error message may be displayed on screen 80 or otherwise reported to a user, and the validation process begins again at block 108. For example, the chart 45 may be incorrectly placed on object 70; e.g., the mat, or outside the field of view of the imaging device 35. If the four corners of the color calibration chart 45 are found, then the method 100 continues to block 111, wherein the processor 30 calculates the coordinates of the twenty-four regions of interest, ROI, on the color calibration chart 45. This information is used to determine the orientation of the color calibration chart 45 or other object with known color profiles. In an example, the color calibration chart 45 is orientation agnostic and may be placed in a 180° rotation on the object 70; e.g., the mat, and may still be properly validated with the Pass/Fail criteria, further described below, redefined to account for the detected orientation.

Accordingly, in block 112, the processor 30 determines the color placement orientation of the color calibration chart 45 based on the image 25 of the color calibration chart 45 captured by the imaging device 35. In this regard, different objects may look different or appear to have a different color based on the light source. In block 113, the processor 30 compares the color information of the captured image 28 with the Golden Value RGB value, which is the perfectly balanced RGB value having a red value of 243, a green value of 243, and a blue value of 230 for the white checker, as an example. In block 114, a pre-defined criteria set is provided comprising a range of different color balance values that is acceptable or tolerable. In block 115, the pre-defined criteria set is processed based on the orientation of the color calibration chart 45 with respect to the light source 60. Next, the processor 30 takes the comparison value determined in block 113 and combines it with the pre-defined criteria set value in block 115 to determine whether they meet predetermined criteria, as indicated in block 116. If the predetermined criteria are not met, then the validation process is not considered to be successful; e.g., block 117 indicating a Fail. If the predetermined criteria are met, then the validation process is considered to be successful; e.g., block 118 indicating a Pass. Thereafter, the results are stored in memory 75 or reported; e.g., displayed on screen 80, etc. in block 119. The method 100 is aware of the light source 60 at the beginning of the process; e.g., block 101, thus the color balance values are instantaneously enabled, which reduces the time necessary to determine the color balance values. The method 100 is versatile in the situation when the light source 60 is not uniform across the field of view of the imaging device 35, thereby resulting in different Pass/Fail criteria in block 116 depending on the orientation of the object 70, as the variation of the light 90 coming from the light source 60 will impact the color patches differently in the image 95. Without accounting for light variation across the field of view of the imaging device 35, the chromaticity criteria would cause the validation test to fail; e.g., block 117. Once the orientation of the chart 45 is established, then the pre-defined criteria in block 114 for this orientation is set and the output color information of the object 70 is compared with the criteria. Again, if the criteria has not been met, then the validation process is considered to Fail as provided in block 117, and if the criteria has been met, then the validation process is considered to Pass as provided in block 118.

When block 118 is reached, then the results of block 119 may be used for achieving color balanced images towards other chromaticities, which may be used to provide color filters based on precise chromatic target values. For example, if a user wants the image 95 to be tinted to a certain color or hue, a color filter may be created to provide the desired tinting value regardless of whether the light source 60 is of the same color, or not. Moreover, a color filter may be created and the tinting effect may be provided whether the image 95 is to be used for visual effect or for deciphering purposes, among other use cases. Also, the reverse situation is possible, where the light source 60 may not be ideal in color temperature and may compromise the output image 95 or video quality. In this case, the imaging device 35 may cancel out these color effects and produce an enhanced white light balanced output or another color depending on user preference.

Various examples described herein may include both hardware and software elements. The examples that are implemented in software may include firmware, resident software, microcode, etc. Other examples may comprise a computer program product configured to include a pre-configured set of instructions, which when performed, may result in actions as stated in conjunction with the methods described above. In an example, the pre-configured set of instructions may be stored on a tangible non-transitory computer readable medium or a program storage device containing software code.

Figure 6A:
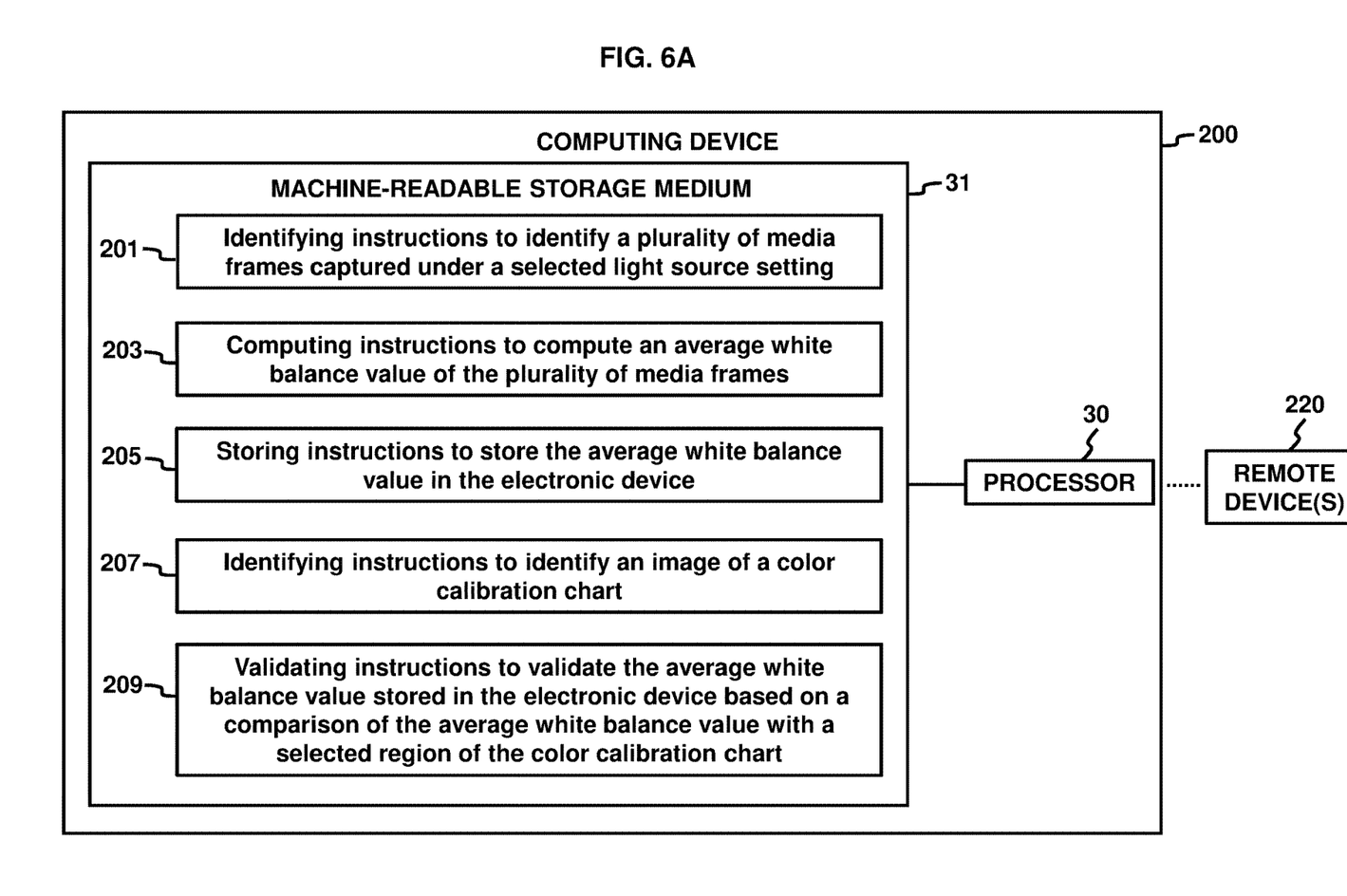
FIG. 6A is system block diagram of a computing device for performing a color balance calibration and validation process, according to an example.
Figure 6B:
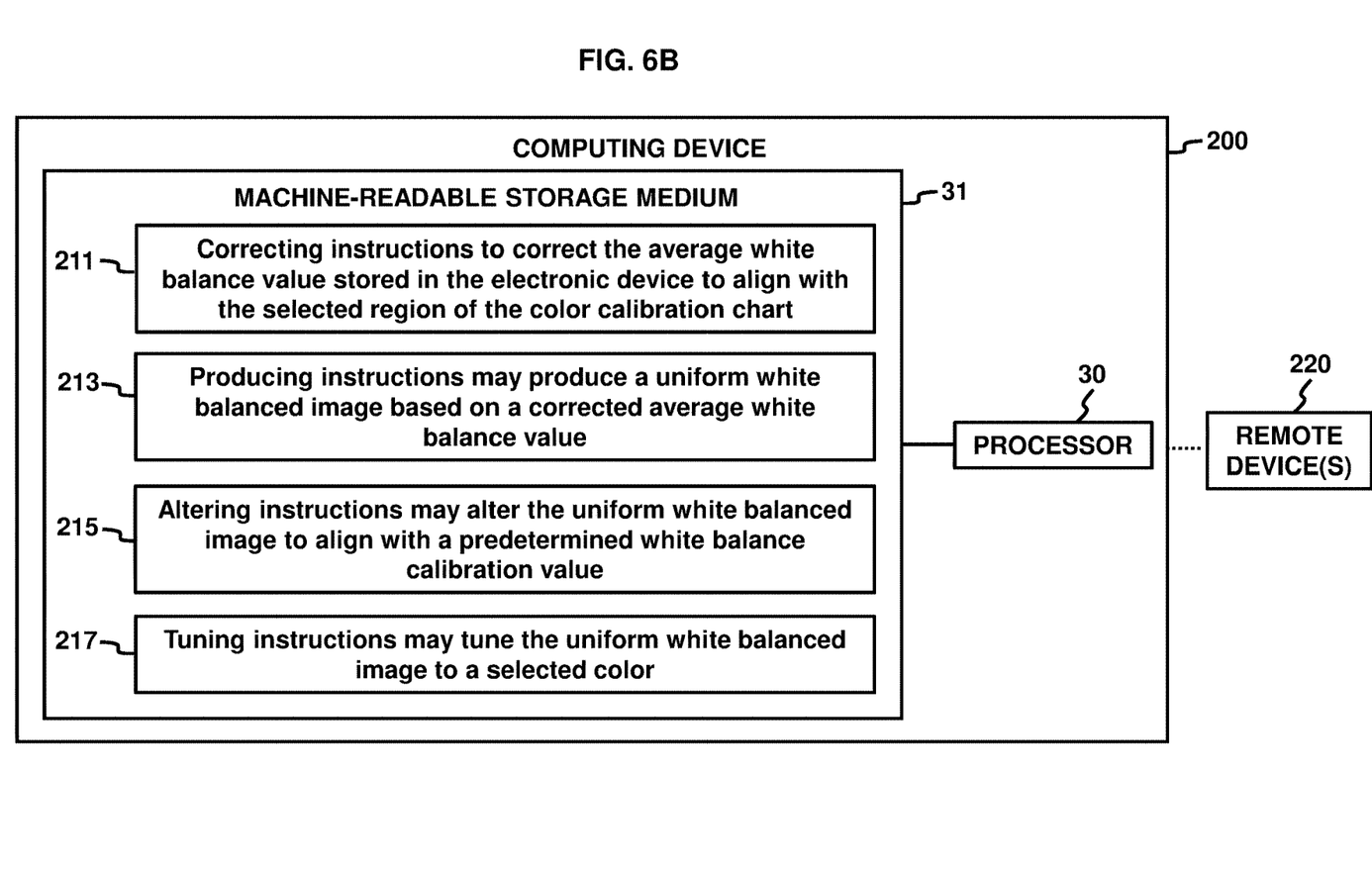
FIG. 6B is system block diagram of a computing device for performing a color balance calibration and validation process, according to another example.

FIGS. 6A and 6B, with reference to FIGS. 1 through 5, are block diagrams of a computing device 200 for performing a color balance calibration and validation process, according to various examples. The computing device 200 may be the electronic device 10 of FIGS. 1 through 4B, in one example. The computing device 200 may be any other electronic device with image capturing functionality, according to another example. In the example of FIGS. 6A and 6B, the computing device 200 includes the processor 30 of FIGS. 1 through 3 and a machine-readable storage medium 31.

Processor 30 may include a central processing unit (CPU), microprocessors, and/or other hardware devices suitable for retrieval and execution of instructions stored in machine-readable storage medium 31. Processor 30 may fetch, decode, and execute computer-executable instructions 201, 203, 205, 207, 209 to enable execution of locally-hosted or remotely-hosted applications for performing the color balance calibration and validation process. The remotely-hosted applications may be accessible on one or more remotely-located devices 220, for example. As an alternative or in addition to retrieving and executing instructions, processor 30 may include one or more electronic circuits comprising a number of electronic components for performing the functionality of one or more of instructions 201, 203, 205, 207, 209.

The machine-readable storage medium 31 may be memory 75 or linked to memory 75 of FIG. 3, in one example, and may be any electronic, magnetic, optical, or other physical storage device that stores executable instructions. Thus, machine-readable storage medium 31 may be, for example, Random Access Memory (RAM), an Electrically-Erasable Programmable Read-Only Memory (EEPROM), a storage drive, an optical disc, and the like. The machine-readable storage medium 31 may be encoded with executable instructions for enabling execution of remotely-hosted applications accessed on the one or more remotely-located devices 220.

In an example, the processor 30 of the electronic device 10 executes computer readable instructions. For example, in FIG. 6A, computer-executable identifying instructions 201 may identify a plurality of media frames 20 captured under a selected light source setting. Computer-executable computing instructions 203 may compute an average color balance value 18 of the plurality of media frames 20. Computer-executable storing instructions 205 may store the average color balance value 18 in the electronic device 10. Computer-executable identifying instructions 207 may identify an image 40 of a color calibration chart 45. Computer-executable validating instructions 209 may validate the average color balance value 18 stored in the electronic device 10 based on a comparison of the average color balance value 18 with a selected region 50 of the color calibration chart 45.

As indicated in FIG. 6B, computer-executable correcting instructions 211 may correct the average color balance value 18 stored in the electronic device 10 to align with the selected region 50 of the color calibration chart 45. Again, the selected region 50 may comprise one or more tiles in the color calibration chart 45. Computer-executable producing instructions 213 may produce a uniform color balanced image 95 based on a corrected average color balance value. Computer-executable altering instructions 215 may alter the uniform color balanced image 95 to align with a predetermined color balance calibration value. Computer-executable tuning instructions 217 may tune the uniform color balanced image 95 to a selected color.

The examples describe a color balance calibration and validation technique whereby the light source does not have to be uniform in light output and color temperature. One example calibrates to a neural white surface and may use a ColorChecker® tile in order to validate the calibration. The examples described provide for tuning an imaging device to a known light source to achieve a color balanced image; either video or still images. More particularly, the technique described is not changing the automatic color balance algorithm itself, but rather the technique is employing the color balance algorithm and verifying it based on a desired output. The examples described tune to a color point light source and validate it. The examples described utilize the stable while balance of several image/video frames to perform a color balance computation. The examples provide for automatic color balance for imaging devices as used as a means for color point correction to a light source.

The present disclosure has been shown and described with reference to the foregoing exemplary implementations. Although specific examples have been illustrated and described herein it is manifestly intended that the scope of the claimed subject matter be limited only by the following claims and equivalents thereof. It is to be understood, however, that other forms, details, and examples may be made without departing from the spirit and scope of the disclosure that is defined in the following claims.

What is claimed is:

1. An electronic device comprising:
    an image sensing tool to measure an average color balance value across a plurality of frames of a media stream;
    a processor to verify that the average color balance value is stable, and compute a selected color balance value of the media stream; and
    an imaging device to capture an image of a predetermined color calibration chart,
    wherein the processor is to:
        compare a color balance value of the image of the predetermined color calibration chart with a predefined color balance value; and
        validate the selected color balance value of the media stream to align with a selected region of the image.
2. The electronic device of claim 1, wherein the predefined color balance value comprises a balanced red, green, blue (RGB) value.

3. The electronic device of claim 1, wherein the imaging device is to capture the media stream under a selected light source setting.

4. The electronic device of claim 1, wherein the processor is to produce a uniform color balanced media stream based on a corrected color balance value.

5. The electronic device of claim 4, wherein the processor is to remove color aberrations and color artifacts from the uniform color balanced media stream.

6. The electronic device of claim 1, wherein the processor is to produce user-defined chromatic images based on a corrected color balance value.

7. An electronic device comprising:
    a light source to project light on an object at a selected lighting level;
    an imaging device to capture a media stream of the object and a predetermined color calibration chart;
    an image sensing tool to measure a color balance value of the media stream; and
    a processor to:
        compute a selected color balance value of the media stream;
        align the selected color balance value of the media stream with a selected region of the predetermined color calibration chart; and
        perform a color balance validation of the media stream to the selected lighting level.

8. The electronic device of claim 7, wherein the selected lighting level comprises non-uniform light.

9. The electronic device of claim 7, comprising a projector to output a color balanced media stream based on a color balance calibration value.

10. The electronic device of claim 9, comprising a memory to store the color balance calibration value, wherein the processor is to alter the color balanced media stream output from the projector to align with the color balance calibration value stored in the memory.

11. A non-transitory computer readable medium comprising instructions that when executed cause a processor of an electronic device to:
    identify a plurality of media frames captured under a selected light source setting;
    compute an average color balance value of the plurality of media frames;
    store the average color balance value in the electronic device;
    identify an image of a color calibration chart; and
    validate the average color balance value stored in the electronic device based on a comparison of the average color balance value with a selected region of the color calibration chart.

12. The non-transitory computer readable medium of claim 11, wherein the processor is to correct the average color balance value stored in the electronic device to align with the selected region of the color calibration chart.

13. The non-transitory computer readable medium of claim 12, wherein the processor is to produce a uniform color balanced image based on a corrected average color balance value.

14. The non-transitory computer readable medium of claim 13, wherein the processor is to alter the uniform color balanced image to align with a predetermined color balance calibration value.

15. The non-transitory computer readable medium of claim 13, wherein the processor is to tune the uniform color balanced image to a selected color.

\* \* \* \* \*